(No Model.)

W. B. PARROT.
NUT LOCK.

No. 477,149. Patented June 14, 1892.

WITNESSES:
J. A. Bergstrom
C. Sedgwick

INVENTOR:
W. B. Parrot
BY
Munn & Co
ATTORNEYS

UNITED STATES PATENT OFFICE.

WATERS B. PARROT, OF ELIZABETH, NEW JERSEY.

NUT-LOCK.

SPECIFICATION forming part of Letters Patent No. 477,149, dated June 14, 1892.

Application filed December 14, 1891. Serial No. 414,968. (No model.)

*To all whom it may concern:*

Be it known that I, WATERS B. PARROT, of Elizabeth, in the county of Union and State of New Jersey, have invented a new and useful Improvement in Nut-Locks, of which the following is a full, clear, and exact description.

My invention relates to an improvement in nut-locks, and has for its object to provide a lock of simple, durable, and economic construction, so made that the nut may be screwed upon a bolt and carried in engagement with a washer in such a manner as to prevent the bolt from leaving the washer when carried to an engagement therewith, unless it is desired to remove it; and a further object of the invention is to provide a means whereby when it is desired to remove the nut from the bolt it may be readily accomplished.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
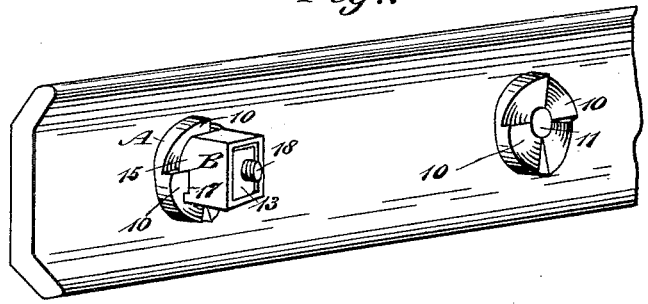
Figure 3:
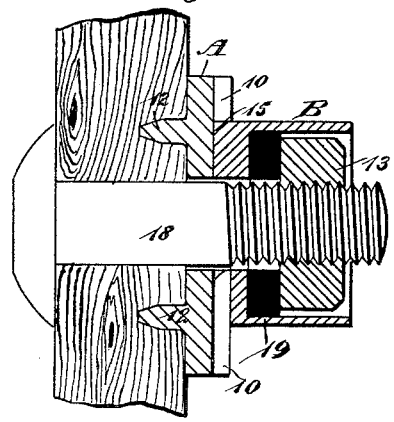
Figure 2:
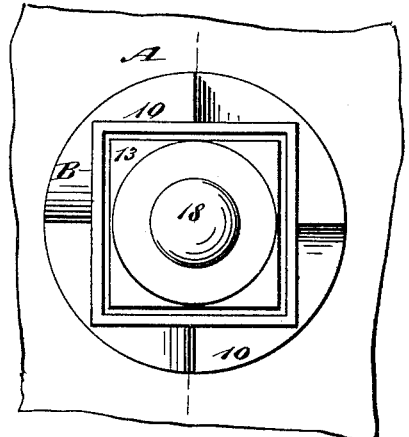
Figure 5:
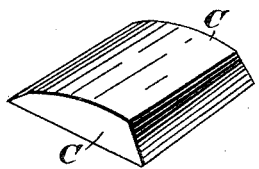
Figure 4:
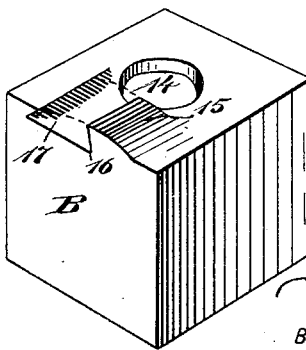

Figure 1 is a perspective view of a fish-plate, illustrating the nut-lock as applied thereto. Fig. 2 is an enlarged end view of the nut-lock. Fig. 3 is a vertical section through the nut-lock, illustrating its application to a wooden beam. Fig. 4 is a detail perspective view of the lock box or shell, and Fig. 5 is a detail perspective view of a bridge-piece adapted to be used in connection with the box or shell when the nut is to be removed from the bolt.

The invention comprises particularly a washer A, adapted to be held in a fixed position, a locking box or shell B, and a bridge-section C, adapted for use at times in connection with the box or shell. The washer A, when the device is to be used in connection with fish-plates, is preferably made an integral portion of the plate; but it may be attached thereto if in practice it is found desirable, and in construction the washer is ordinarily made circular and its front face is provided with a series of inclined planes 10, one plane rising from the lower portion of the next, as is best shown in Fig. 1. The washer is also provided with a central aperture 11. When the washer is to be used in connection with wood or when it is desirable to remove a washer at any time, it is usually provided at its back, which is flat, with pins 12, the said pins being adapted to be driven into the article to which the washer is to be applied, as shown in Fig. 3. The locking box or shell B is shaped in accordance with a nut 13, the latter being of the usual construction, either rectangular or polygonal. In the drawings both the box or shell and nut are shown as rectangular and the locking box or shell B has its outer side entirely open, while the inner side or face is closed with the exception of the center, at which point an opening 14 is produced. At one side of the closed face of the box or shell a lug 15 is formed, the inner face of which lug is slightly undercut, as illustrated at 16 in Fig. 4, and the top of the lug inclines downward from its inner edge until it loses itself in the face of the box or shell. Immediately in front of the inner edge of the lug 15 a groove 17 is produced in the closed face of the box or shell, the groove being more or less dovetail in cross-section. This groove is adapted to receive the bridge-piece C, above alluded to, and this bridge-piece is substantially the counterpart in shape of the lug 15. When the bridge-piece is introduced into the recess 17, it, together with the lug 15, forms a cylindrical or semicircular projection upon the closed face of the box or shell. After the bolt 18 has been passed through a fish-plate—for instance, the rail and the opposite fish-plate and its attached washer A—the locking box or shell B is placed upon the threaded end of the bolt, its open side outward and its closed side facing the washer. Before the locking box or shell is placed upon the bolt, however, the bridge-piece C is removed from the groove 17, if it had been previously placed therein. When the locking box or shell is in position upon the bolt, a washer 19, of leather, rubber, or other elastic material, is also preferably passed over the end of the bolt to an engagement with the inner or the front portion of the locking box or shell. An ordinary nut 13 is then screwed upon the threaded end of the bolt until it has been entered partially or entirely within the locking box or shell B, whereupon the locking box or shell is turned, carrying with it the nut 13, until the lug 15 engages with the inclined planes upon the washer, and the locking box or shell is screwed up until a firm binding engagement is effected between the lug 15 and the washer, the inner face of the lug engaging with the elevated end surface of one of the inclined planes, as shown in Fig. 1. When this engagement of the locking box or shell has been effected, it cannot be loosened by any jar or strain brought to bear upon it until the bridge-piece C is forced in its groove 17, and when this is accomplished the nut may be readily unscrewed from the bolt, as the cylindrical surfaces at this time formed upon the locking box or shell will slip over the raised portions of the inclined planes.

The device is exceedingly simple, durable, and economic and will effect a firm connection of parts that it is employed to bind together.

Having thus described my invention, I claim as new and desire to secure by Letters Patent—

1. In a lock-nut, the combination, with a washer having an aperture to receive a bolt and having its outer face formed as a series of inclined planes, of a lock box or shell and adapted for use in connection with an ordinary nut, one closed face of the box or shell being provided with a lug the upper surface of which is inclined, the said lug being adapted for engagement with the inclined planes of the washer, substantially as shown and described.

2. In a locking-nut, the combination, with a washer provided with an opening therein and having one face formed as a series of inclined planes and a bolt passed through the washer, of a locking box or shell screwed upon the bolt, having its inner face provided with a lug the top surface of which is inclined, the said lug being adapted for engagement with the inclined planes of the washer, an elastic washer carried by the bolt and engaging with the inner surface of the locking box or shell, and a jam-nut screwed upon the bolt entering the locking box or shell and engaging with the washer, substantially as shown and described.

3. In a lock-nut, the combination, with a washer having an opening in its center and one face shaped as a series of inclined planes, and a bolt passed through the washer, of a locking box or shell the inner face of which has produced thereon a lug having an inclined top surface, the said locking box or shell being also provided with a groove adjacent to the inner face of the lug, a jam-nut screwed upon the bolt and adapted to enter the locking box or shell and turn therewith, and a bridge-piece having its upper surface inclined, the said bridge-piece being adapted to enter the locking box or shell, as and for the purpose specified.

4. In a lock-nut, the combination, with a washer having one face formed as a series of inclined planes and a bolt passed through the washer, of a locking box or shell and entered upon the bolt, the inner face of which locking box or shell is provided with a lug the outer face of which is inclined, and a groove adjacent to the inner raised surface of the lug, a bridge-piece inclined in an opposite direction to the lug and adapted to enter the groove in the locking box or shell, an elastic washer carried by the bolt and located within the locking box or shell, and a jam-nut located upon the bolt and entered into the locking box or shell, substantially as shown and described.

WATERS B. PARROT.

Witnesses:
GEO. E. PARROT,
JOSEPH ALWARD.